United States Patent
Tsaur et al.

(10) Patent No.: US 7,127,479 B2
(45) Date of Patent: Oct. 24, 2006

(54) ONE-PASS NODE-BASED MESSAGE PROCESSING

(75) Inventors: Ynn-Pyng Anker Tsaur, Oviedo, FL (US); Baige Wang, Lake Mary, FL (US); Kirk L. Searls, Maitland, FL (US)

(73) Assignee: VERITAS Operating Corporation, Mountain View, CA (US)

( * ) Notice: Subject to any disclaimer, the term of this patent is extended or adjusted under 35 U.S.C. 154(b) by 537 days.

(21) Appl. No.: 10/244,725

(22) Filed: Sep. 16, 2002

(65) Prior Publication Data

US 2004/0054697 A1     Mar. 18, 2004

(51) Int. Cl.
*G06F 12/00*    (2006.01)
*G06F 17/30*    (2006.01)

(52) U.S. Cl. ..................................... 707/204
(58) Field of Classification Search .............. 707/1–10, 707/200–204
See application file for complete search history.

(56) References Cited

U.S. PATENT DOCUMENTS

| | | | | |
|---|---|---|---|---|
| 5,276,867 A | * | 1/1994 | Kenley et al. ............... | 707/204 |
| 6,047,294 A | * | 4/2000 | Deshayes et al. ........... | 707/204 |
| 6,385,706 B1 | * | 5/2002 | Ofek et al. .................. | 711/162 |
| 6,397,308 B1 | * | 5/2002 | Ofek et al. .................. | 711/162 |
| 6,549,992 B1 | * | 4/2003 | Armangau et al. .......... | 711/162 |
| 6,766,412 B1 | | 7/2004 | Bolt ........................... | 711/111 |
| 6,823,336 B1 | | 11/2004 | Srinivasan et al. ............ | 707/8 |
| 2003/0145083 A1 | * | 7/2003 | Cush et al. .................. | 709/224 |

OTHER PUBLICATIONS

Stager, R. and D. Hitz "Network Data Management Protocol", Network Working Group Internet Draft, document version 1.7.3, Oct. 1996.*
Veritas VERITAS NetBackup™ 3.4 for NDMP System Administrator's Guide, document No. 100-001492, Jun. 2000.*
Legato "NDMP Support in NetWorker 6.1.X", downloaded from www.legato.com, Jan. 2002.*
Veritas "patchNB_DMP_34_sA.ONLINE_README", README file documenting patch to version 3.4 of NetBackup for NDMP, May 15, 2002.*
Syncsort "Backup Express: The High Performance Enterprise Backup and Restore Solution", product brocure, downloaded fro www.syncsort.com, 2002.*

(Continued)

*Primary Examiner*—Luke S Wassum
(74) *Attorney, Agent, or Firm*—Meyertons Hood Kivlin Kowert & Goetzel, P.C.; B. Noël Kivlin (57) ABSTRACT

One or more computer systems, a carrier medium, and a method are provided for creating a catalog for backup data using NDMP file history messages. The messages are received at a first computer system (NDMP client) from a second computer system (NDMP host). Each message comprises information describing a filesystem node (a file or directory). The messages comprise hierarchy information and attribute information for the nodes. For each message comprising hierarchy information, an entry may be created for the respective node in a catalog, and the hierarchy information for the respective node may be stored in the catalog. For each message comprising attribute information, the attribute information for the respective node may be stored in the catalog. The messages may be processed in a single pass without caching them all. A carrier medium may include program instructions which, when executed, cause the above operations on one or more computer systems.

16 Claims, 10 Drawing Sheets

OTHER PUBLICATIONS

Veritas VERITAS NetBackup™ 4.5 for NDMP System Administrator's Guide, Jan. 2003.*
Roth, B. "DAR (Direct Access Recovery)—A Look Under the Covers", downloaded from www.veritas.com, Apr. 22, 2003.*
IBM "IBM Tivoli Storage Manager for HP-UX: Administrator's Guide", version 5.2, document No. GC32-0772-01, Jun. 200*
Spectra Logic "Backup Express on Solaris with NDMP Support", document No. SDOC Apr. 2003 Revision A, 2003.*
NDMP "Protocol Specification Summary", document version 1.7.1 S, Aug. 26, 1996.*
NDMP "Protocol Specification", document version 1.7.2, Oct. 24, 1996.*
Watters, P.A. and S. Veeraraghavan "Solaris 8: The Complete Reference", Berkeley:Osborne/McGraw-Hill, 2000, pp. 296-310.*
BakBone "BakBone Software, Network Appliance Announce NetVault™ 6.03 NDMP Application Plug-In Modules for NetApp® Filers", Press Release, Jan. 30, 2001.*
Kennedy, J. "NDMP Backups Going 30 Hours", [Veritas-bu] newsgroup discussion thread, Oct. 2, 2001.*
Atempo "Time Navigator for NDMP", product brochure, downloaded from www.atempo.com, 2001.*
Breniser, L. "One More NetBackup Question", newsgroup discussion thread, Apr. 10, 2002.*
Sahlberg, R. "Source code for packet-ndmp.c library", downloaded from bob.marlboro.edu/~msie/2003/it1/tools/ethereal/ethereal-0.9.7/packet-ndmp.c, Aug. 28, 2002.*

* cited by examiner

ONE-PASS NODE-BASED MESSAGE PROCESSING

BACKGROUND

1. Field of the Invention

This invention is related to the field of computer systems and, more particularly, to network-based backup of storage in computer systems.

2. Description of the Related Art

Computer systems and their components are subject to various failures which may result in the loss of data. For example, a storage device used in or by the computer system may experience a failure (e.g., mechanical, electrical, magnetic, etc.) which may make any data stored on that storage device unreadable. Erroneous software or hardware operation may corrupt the data stored on a storage device and effectively destroy the data stored on an otherwise properly functioning storage device. Any component in the storage chain between (and including) the storage device and the computer system may experience failure (e.g., the storage device, connectors [e.g., cables] between the storage device and other circuitry, the network between the storage device and the accessing computer system [in some cases], etc.).

To mitigate the risk of losing data, computer system users typically make backup copies of data stored on various storage devices. Typically, backup software is installed on a computer system, and the backup may be scheduled to occur periodically and automatically. Backups may also be initiated manually by a user or administrator of the computer system. Therefore, a primary goal of enterprise storage management is the backup and restoration of information in an intelligent, secure, timely, cost-effective manner over all enterprise-wide operating systems.

The Network Data Management Protocol (NDMP) is an open protocol for enterprise-wide network based backup. NDMP is a network-based protocol that can be used for communications by centralized backup applications and agents on file servers. NDMP meets the strategic need to centrally manage and control distributed data while minimizing network traffic. NDMP, as an embedded protocol, separates the data path and the control path, so that network data can be backed up locally yet managed from a central location. NDMP allows administrators to back up critical data using any combination of compliant network-attached servers, backup devices, and management applications. The NDMP architecture allows network-attached storage vendors to ship NDMP-compliant file servers which can be used by any NDMP-compliant backup administration application. This same architecture may also be used for network-attached backup devices, such as tape drives and tape libraries.

An enterprise-wide backup may be a complex procedure including numerous elements. For example, the data to be backed up must be defined. Complex interactions with the backup media device and extensive cataloguing and control must be managed. The backup should also assure data protection and efficient restoration of mission-critical data in the event of data loss. These elements may require data flows across various hosts, clients, and backup devices in the enterprise. NDMP defines common functional interfaces used for these data flows. For example, file system data flows from the file system to the backup device may use a common interface, regardless of the platform or device. Control or file meta-data may be passed to and from the backup software using common interfaces, regardless of the software package.

One of these data flows may include a stream of file history information. The file history information may include two message types: DIR messages including hierarchy information such as the name of the node, node identification (e.g., node number), and parent node identification (e.g., parent node number) of a specific node (i.e., a directory or file); and NODE messages including other attribute information (e.g., permissions, creation and modification dates, and other meta-data) for a specific node. These messages may represent both directory and leaf nodes of a file system, and they may arrive in random order. Therefore, one cannot make assumptions about the order of the DIR and NODE messages based on the order of receipt. Consequently, when a DIR message arrives, it may not be known whether the message represents a directory or a file, and it therefore is difficult to establish the correct relationship among all directories and files in an efficient manner. Typically, the message-processing software must perform multiple passes on the messages in order to establish the correct relationship.

Therefore, an improved system and method for performing network-based backup are desired.

SUMMARY OF THE INVENTION

One or more computer systems, a carrier medium, and a method are provided for creating a catalog for backup data using NDMP file history messages. A plurality of the messages may be received at a first computer system from a second computer system. For each message, the information for the respective node may be stored in the catalog. The messages may be processed in a single pass without caching all the messages. For each of at least some of the plurality of messages, the storing of the information for the respective node in the catalog is performed prior to receipt by the first computer system of others of the plurality of messages. A carrier medium may include program instructions which, when executed, cause the above operations on one or more computer systems.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Figure 1:
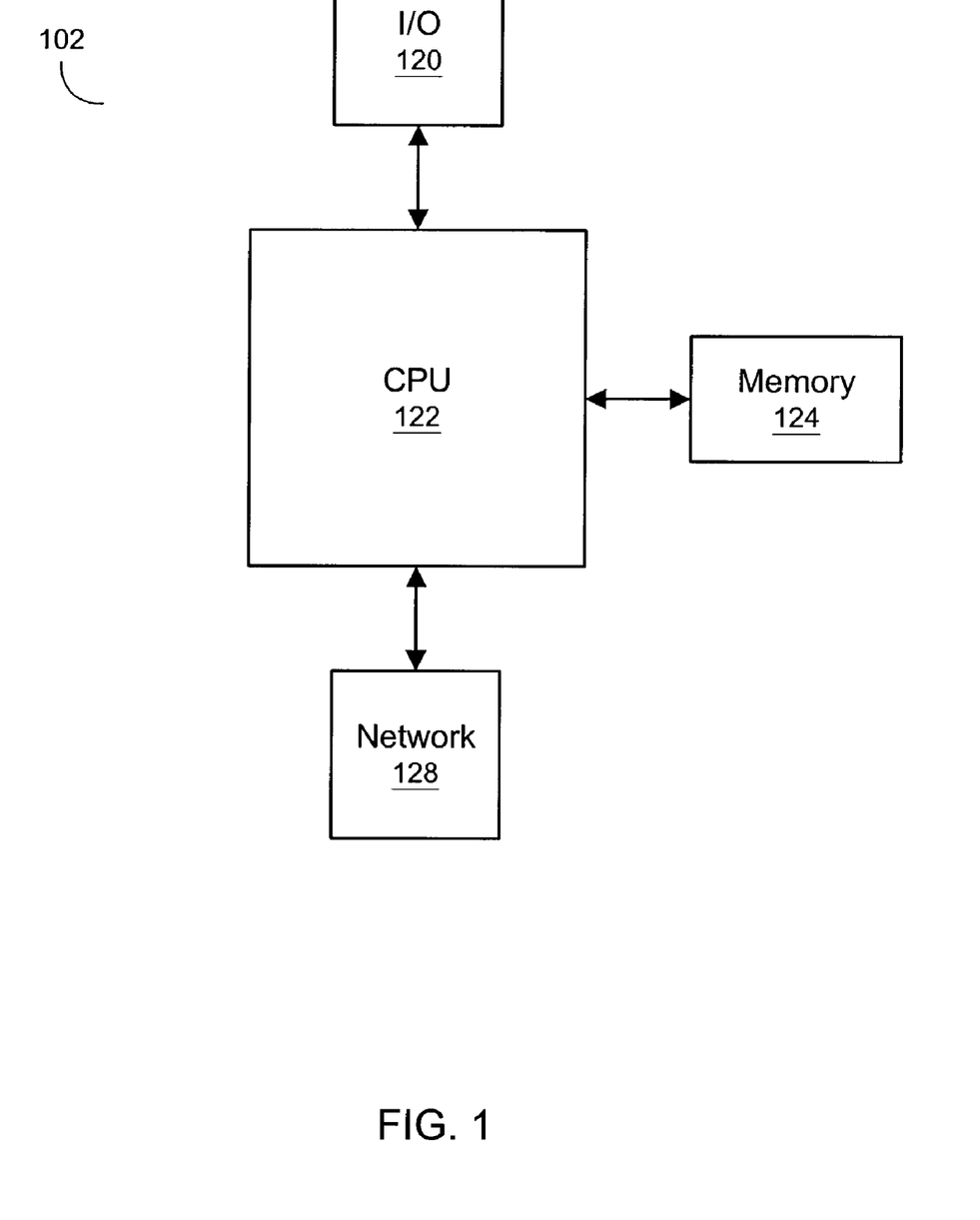
FIG. 1 is a block diagram of one embodiment of a computer system which implements a system and method for inter-process messaging as described herein.

FIG. 1 illustrates a computer system 102 which implements a system and method for message processing according to one embodiment. In various embodiments, the computer system 102 may comprise a desktop computer, a laptop computer, a palmtop computer, a network computer, a personal digital assistant (PDA), an embedded device, a smart phone, or any other suitable computing device. The computer system 102 includes at least one central processing unit (CPU) or other processor(s) 122. The CPU 122 is preferably coupled to a memory medium 124 which may store program instructions which implement the system and method for message processing as described herein. The CPU 122 is configured to execute the program instructions for message processing.

As used herein, the term "memory medium" includes a non-volatile medium, e.g., a magnetic medium, hard disk, or optical storage; a volatile medium, such as computer system memory, e.g., random access memory (RAM) such as DRAM, SDRAM, SRAM, EDO RAM, Rambus RAM, etc.; or an installation medium, such as CD-ROM, floppy disks, or a removable disk, on which computer programs are stored for loading into the computer system. The term "memory medium" may also include other types of memory. The memory medium 124 may therefore store program instructions and/or data which implement the system and method for message processing as described herein. Furthermore, the memory medium 124 may be utilized to install the program instructions and/or data. In a further embodiment, the memory medium 124 may be comprised in a second computer system which is coupled to the computer system 102 through a network 128. In this instance, the second computer system may operate to provide the program instructions stored in the memory medium 124 through the network 128 to the computer system 102 for execution.

The CPU 122 may also be coupled through an input/output bus 120 to one or more input/output devices that may include, but are not limited to, a display device such as a monitor, a pointing device such as a mouse, a keyboard, a track ball, a microphone, a touch-sensitive display, a magnetic or paper tape reader, a tablet, a stylus, a voice recognizer, a handwriting recognizer, a printer, a plotter, a scanner, and any other devices for input and/or output. The computer system 102 may acquire program instructions and/or data for implementing the system and method for message processing as described herein through the input/output bus 120.

The CPU 122 may include a network interface device 128 for coupling to a network. The network may be representative of various types of possible networks: for example, a local area network (LAN), wide area network (WAN), or the Internet. The system and method for message processing as described herein may therefore be implemented on a plurality of heterogeneous or homogeneous networked computer systems such as computer system 100 through one or more networks. Each computer system 100 may acquire program instructions and/or data for implementing the system and method for message processing as described herein over the network.

Figure 2A:
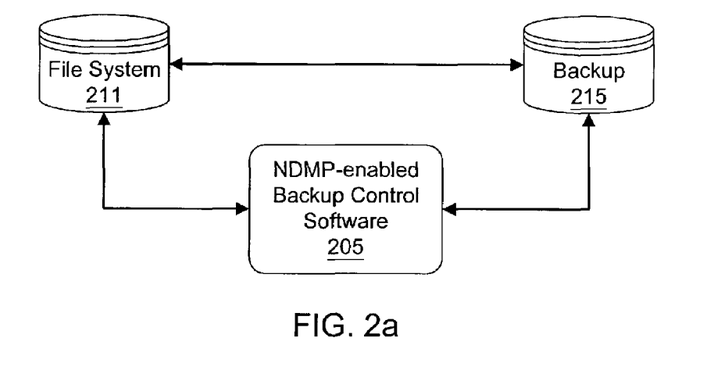
FIG. 2a is a block diagram illustrating the role of NDMP-enabled backup control software according to one embodiment.

In a network environment, the backup of stored data on the computer system 102 may require elements may require data flows across various hosts, clients, and backup devices on the network. The Network Data Management Protocol (NDMP) defines common functional interfaces which may be used for these data flows. FIG. 2a is a block diagram illustrating the role of NDMP-enabled backup control software according to one embodiment. For example, file system data flows from the file system 211 to the backup device 215 may use a common interface, regardless of the platform or device. Control or file meta-data may be passed to and from the backup software 205 using common interfaces, regardless of the software package.

Figure 2B:
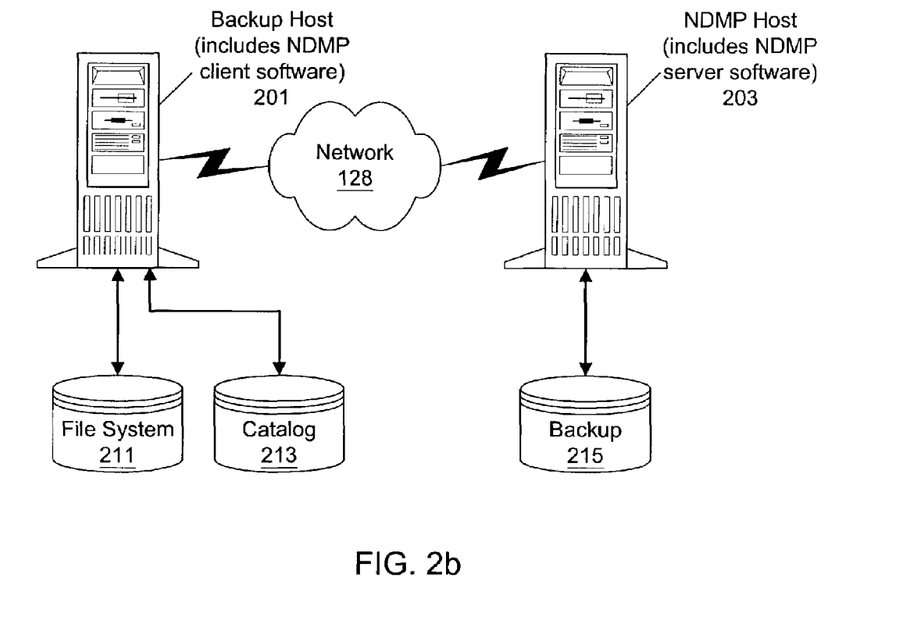
FIG. 2b is a block diagram illustrating a network including NDMP-based storage backup according to one embodiment.

FIG. 2b is a block diagram illustrating a network including NDMP-based storage backup according to one embodiment. NDMP may specify the communication between the server and the backup software. Communication is defined using a series of defined interfaces. These may include XDR-encoded messages that are exchanged over a bidirectional TCP/IP connection to collect information about the data to be backed up. The architecture is based on a client/server model, and the backup software (e.g., on a backup host 201) is considered a client to the NDMP server 203. For every connection between the client on the backup software host 201 and the NDMP host 203, there may be a virtual state machine on the NDMP host 203 that is controlled using NDMP. This virtual state machine is referred to as the NDMP server.

FIG. 2b illustrates a simple configuration for NDMP backup; other configurations may also be used. An NDMP client 201 includes an application that controls the NDMP server. An NDMP host 203 executes the NDMP server application. Data 211 is backed up from the NDMP host to a storage device 215 such as a local tape drive or a backup device on a remote NDMP host. An NDMP server includes a virtual state machine on the NDMP host 203 that is controlled using the NDMP protocol. In one embodiment, there is an NDMP server for each connection from NDMP clients to the NDMP host 203.

The catalog 213 may be built during a backup operation and may be used to restore backed-up data. In one embodiment, the catalog 213 is directly coupled to the backup host 201. As used herein, a catalog or file catalog is a collection of meta-data regarding one or more files and/or directories. A catalog may store catalog data which may include, for example, information regarding the parenthood, filename, ownership, access privileges, creation dates, modification dates, file size, and/or hierarchical relationships of one or more files and/or directories. As used herein, a volume is a quantity of storage space on a storage medium (e.g., disk, tape, or volatile storage such as RAM). A volume is a logical storage device that does not necessarily correspond to any particular physical storage device. A physical storage device may include more than one volume, and a volume may span more than one physical storage device.

In one embodiment, the NDMP server provides two services: a data server and a tape server. During a backup operation, the data server may read the data 211 from disk, generate an NDMP data stream using a specified backup format, and send the file history information, if requested, back to the NDMP client on the backup host 201. The file history information may be used to construct the catalog 213. For a retrieval operation, the data server may read the NDMP data stream and restore it back to the disk. The tape server either reads an NDMP data stream and writes it to tape or reads from tape and writes to the NDMP data stream, depending upon whether a backup or restore is taking place.

In one embodiment, the NDMP server may implement the following interfaces for messages from the NDMP client to the NDMP server: CONNECT, CONFIG, SCSI, TAPE, DATA, and MOVER. The CONNECT interface may be used after a client first establishes a connection to an NDMP server. The CONNECT interface allows the NDMP server to authenticate the client and negotiate the version of protocol used. The CONFIG interface may allow an NDMP client to discover the configuration of the NDMP server. The SCSI interface may be used to pass SCSI CDBs through to a SCSI device and retrieve the resulting SCSI status. The NDMP client may use the SCSI interface to control a locally attached jukebox. Software on the NDMP client may construct SCSI CDBs and will interpret the returned status and data. The SCSI interface may also be used to exploit special features of SCSI backup devices. The TAPE interface may support both tape positioning and tape read/write operations. The NDMP client may typically use the TAPE interface to write tape volume header and trailer files. The NDMP client may also use the TAPE interface to position the tape during backups and restores. The DATA interface may handle the format of the backup data. The NDMP client may initiate backups and restores using the DATA interface. The NDMP client may provides all of the parameters that may affect the backup or restore using the DATA interface. The NDMP client should not place any constraints on the format of the backup data; the data should be a stream of data that can be written to the tape device. The MOVER interface may be used to control the reading/writing of backup data from/to a tape device. During a backup, the MOVER reads data from the data connection, buffers the data into tape records, and writes the data to the tape device. During a restore, the MOVER reads data from the tape device and writes the data to the data connection. The MOVER may be responsible for handling tape exceptions and notifying the NDMP client.

In one embodiment, the NDMP server may implement the following interfaces for messages from the NDMP server to the NDMP client: NOTIFY, FILE HISTORY, and LOG. The NOTIFY interface may be used by the NDMP server to notify the NDMP client that the NDMP server requires attention. Messages sent with the FILE HISTORY interface may allow the NDMP server to make entries in the file history for the current backup. The file history may be used by the NDMP client to select files for retrieval. The LOG interface may allow the NDMP server to make entries in the backup log. The operator may uses the backup log to monitor the progress and completion status of the backup. The log may also be used to diagnose problems.

In one embodiment, NDMP messages are asynchronous. Not all request messages may have an associated reply message. An NDMP message may include a message header optionally followed by a message body. Each message may be identified by a message number that is sent as part of the message header. Each message (message header plus message body) may be XDR-encoded and sent within a single XDR record. In one embodiment, messages that cannot be parsed or that have invalid sequence information may be logged on the receiving host without returning a response to the sender.

The NDMP server may use the FILE HISTORY interface to send file history entries to the NDMP client. The file history entries may provide a file-by-file record of every file backed up by the backup method. In one embodiment, the file history data is defined in a UNIX filesystem or NT filesystem compatible format. In one embodiment, there may be two sets of messages for sending file history data. The first set includes the "add path" messages (NDMP_FH_ADD_FILE) for use by filename-based backup methods (e.g., the "tar" and "cpio" commands) for which the full pathname and file attributes are available at the time each file is backed up. The second set includes the "add directory" (NDMP_FH_ADD_DIR) and "add node" (NDMP_FH_ADD_NODE) messages. The second set is for use by inode-based backup methods (e.g., the UNIX dump command) for which the full pathname is not necessarily available at the time each file is backed up.

In one embodiment, the NDMP_FH_ADD_DIR message (also referred to herein as a DIR message) may be defined as follows:

```
* NDMP_FH_ADD_DIR */
struct ndmp_dir
{
    ndmp_file_name      name<>;
    ndmp_u_quad         node;
    ndmp_u_quad         parent;
};
struct ndmp_fh_add_dir_request
{
    ndmp_dir            dirs<>;
};
```

The argument "dirs" may include an array of directory entries. Each entry may include a name, node, and parent. The "name" argument may include an array for the filename for a single node. In one embodiment, the name is not a full pathname, but rather the basename relative to the node's parent directory. The "node" is a node identifier that matches a node in a corresponding add node message. The "parent" argument is a node identifier of the node's parent directory. In one embodiment, the "node" and "parent" arguments includes the inode number of the file.

In one embodiment, the NDMP_FH_ADD_NODE message (also referred to herein as a NODE message) may add a list of file attributes to the file history. These attributes should match a corresponding node identifier from a previous DIR message. For each file, it is desirable for the NODE message to be sent after the corresponding DIR message. However, the client cannot be assured of receiving the DIR and NODE messages in any particular order. In one embodiment, the NODE message may be defined as follows:

```
* NDMP_FH_ADD_NODE */
struct ndmp_node
{
    ndmp_file_stat      stats<>;
    ndmp_u_quad         node;
    ndmp_u_quad         fh_info;
};
struct ndmp_fh_add_node_request
{
    ndmp_node           nodes<>;
};
```

The argument "nodes" may include an array of history entries. Each entry may include stats, a node, and fh_info. The "stats" argument may include an array of file attribute data for a single file. The "node" is a node identifier that matches a node in a corresponding add node message. In one embodiment, the "node" argument includes the inode number of the file. The "fh_info" argument may include file history tape positioning data representing the tape position at the time the file was written to tape. This data may be used by the restore method to perform tape positioning for direct access file retrieval. The positioning data is NDMP-server dependent. Typically, the data will be the byte or record offset from the beginning of the tape of the file to be recovered.

Figure 3:
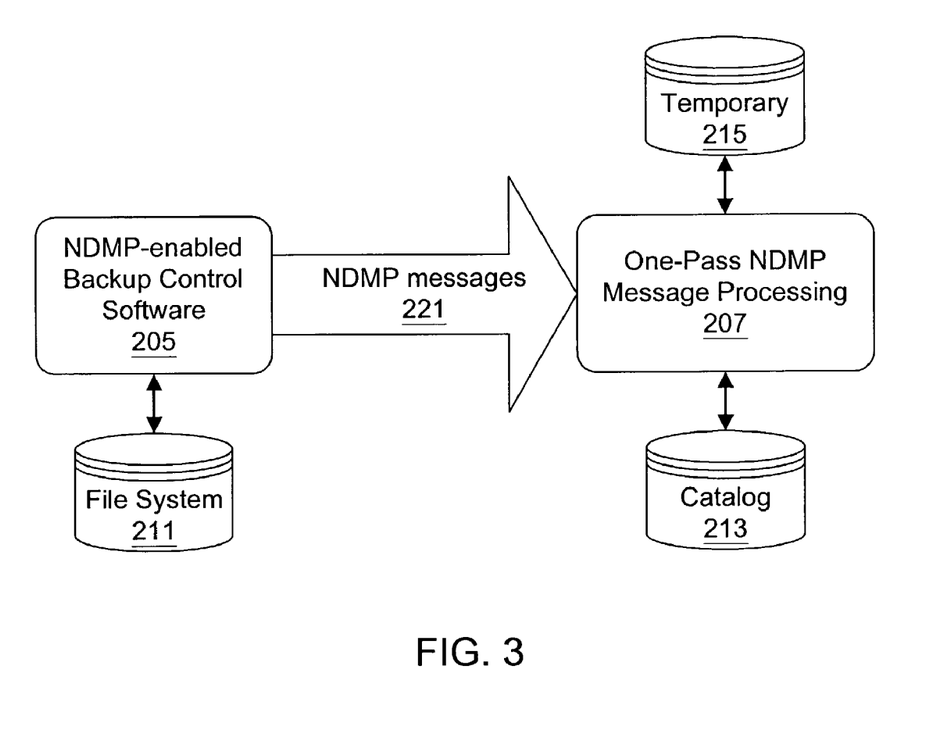
FIG. 3 is a block diagram illustrating a method and system for NDMP-based message processing according to one embodiment.

FIG. 3 is a block diagram illustrating a method and system for efficient processing of NDMP file history messages according to one embodiment. The file history messages 221 may be received for one-pass message processing 207 from backup control software 205 on a backup server such as an NDMP server. Each message comprises information describing a node (files and directories) in a filesystem 211, wherein the nodes comprise files and directories in the filesystem 211. The messages comprise hierarchy information and attribute information for the nodes. For each message comprising hierarchy information, an entry may be created for the respective node in a catalog 213, and the hierarchy information for the respective node may be stored in the catalog 213. For each message comprising attribute information, the attribute information for the respective node may be stored in the catalog 213.

The messages 221 may be processed in a single pass without caching all the messages. In one embodiment, for each of at least some of the plurality of messages, the creation of the entry for the respective node in the catalog 213 is performed prior to receipt by the one-pass message processing software 207 of others of the plurality of messages. In one embodiment, for each of at least some of the plurality of messages, the storing of the hierarchy information for the respective node in the catalog 213 is performed prior to receipt by the one-pass message processing software 207 of others of the plurality of messages. In one embodiment, for each of at least some of the plurality of messages, the storing of the attribute information for the respective node in the catalog 213 is performed prior to receipt by the one-pass message processing software 207 of others of the plurality of messages.

In one embodiment, entries for the nodes may be created in a node table in temporary storage 215. The node table may be implemented in various ways. For example, the node table may be implemented using a sparse matrix with memory-mapped files in one embodiment. In another embodiment, the entire node table may be stored in volatile memory. The entries in the node table may be destroyed after all the hierarchy information and attribute information from the file history messages is stored in the catalog 213. The use of the node table is further illustrated in FIGS. 4a–4g.

FIGS. 4a–4g are flow diagrams illustrating a method for efficient NDMP file-history message processing according to one embodiment. In 401, it may be determined whether there are any NDMP messages 221 remaining to process. If there are no more messages, then the message processing is over. In other words, the method may continue as long as file-history messages 221 are being received by the client from the NDMP server. In 402, it may be determined whether each message is a DIR or NODE message. Processing of DIR messages continues in 411. Processing of NODE messages continues in 431.

Figure 4A:
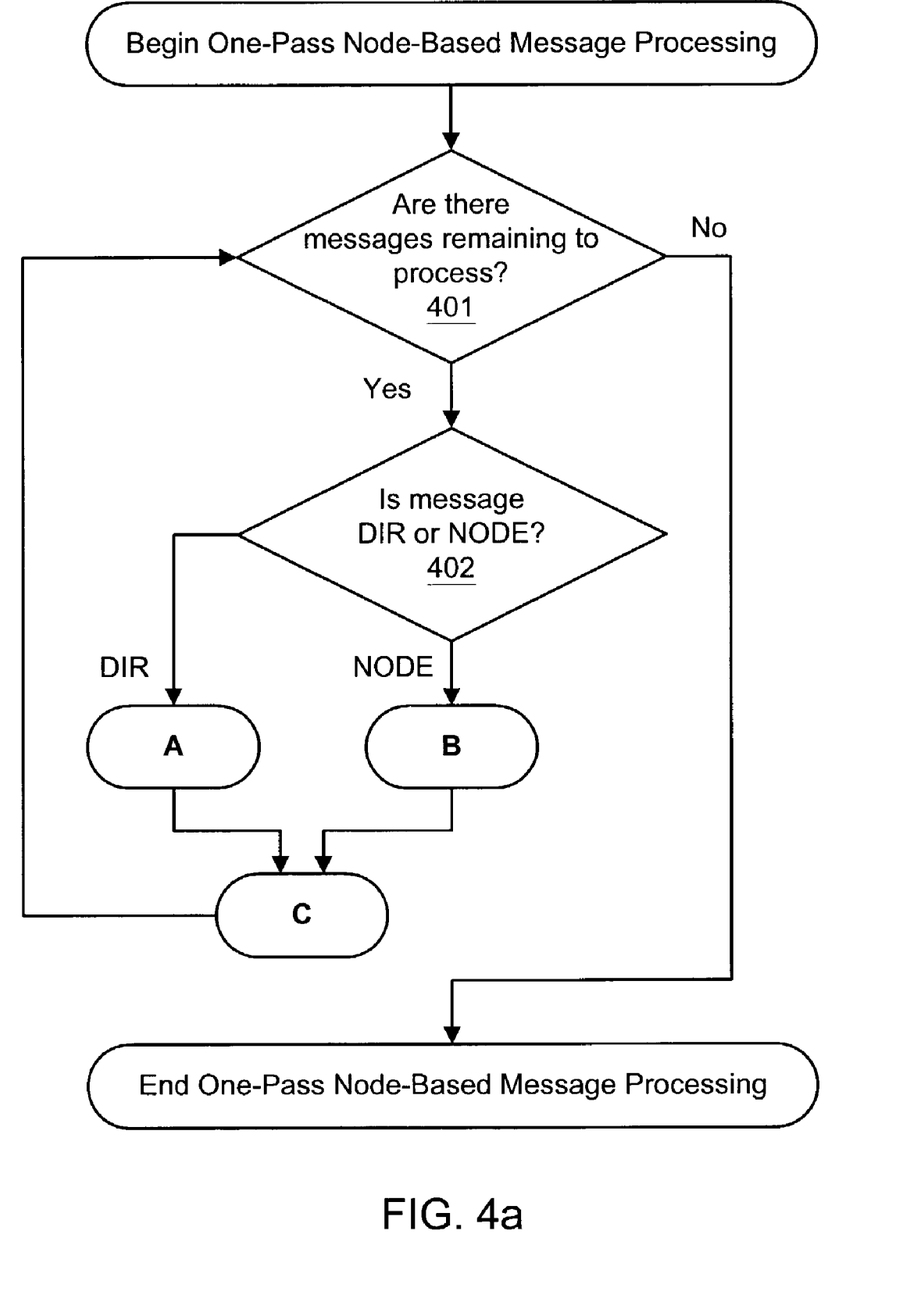
FIGS. 4a–4g are flow diagrams illustrating a method for message processing according to one embodiment.
Figure 4B:
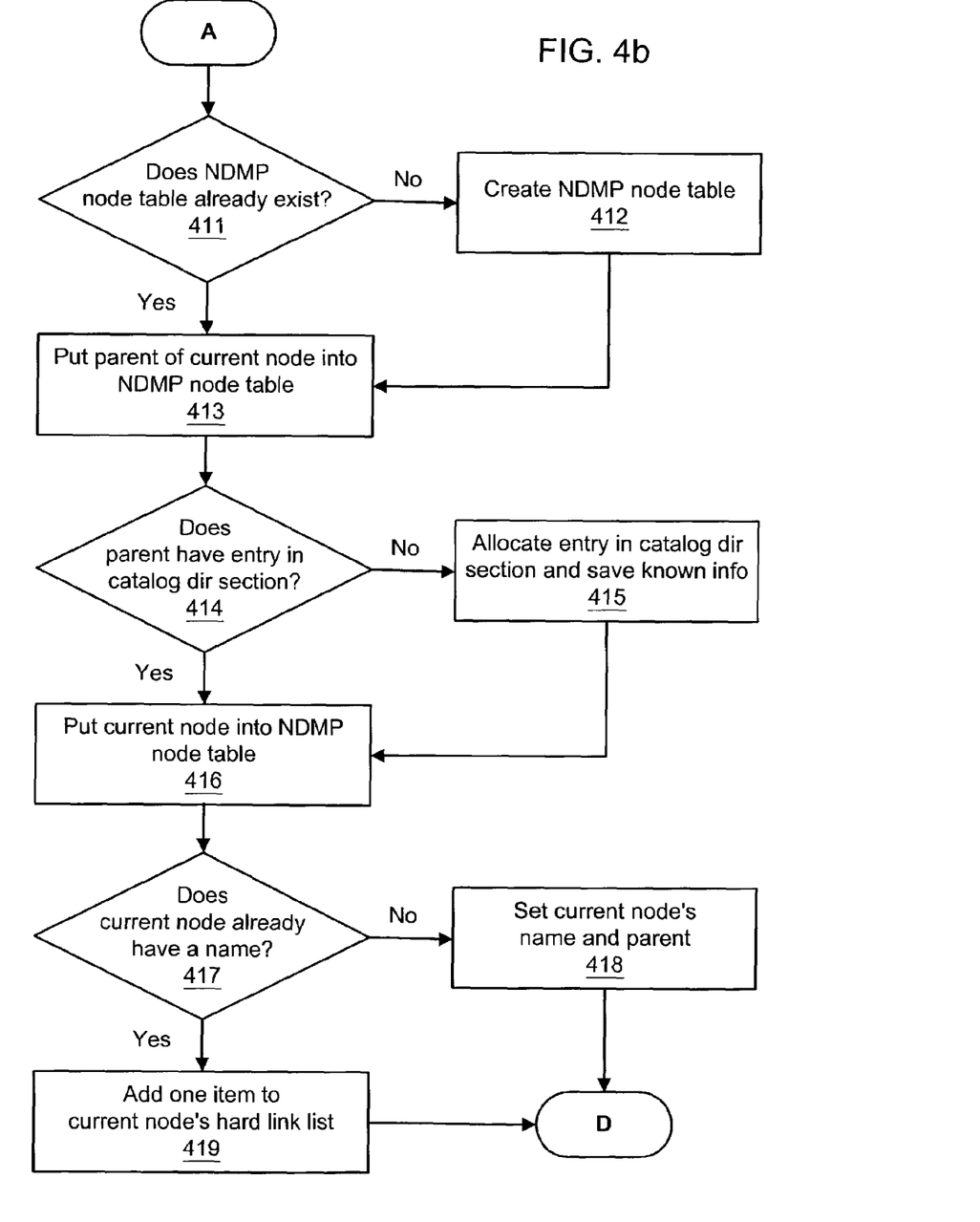

In 411, it may be determined whether the NDMP node table already exists. If not, the table should be created in 412. The node table may be stored in a temporary storage area 215 for the duration of the file-history message processing. In 413, the parent of the current node may be placed into the node table. In 414, it may be determined whether the parent has an entry in the directory section of the catalog 213. If not, then in 415 an entry may be allocated in the catalog directory section, and the information about the parent directory may be saved in the catalog.

In 416, the current node may be placed into the NDMP node table in the temporary storage 215. If it is determined in 417 that the current node already has a name, then one item may be added to the current node's hard link list in 419. Otherwise, the current node's name and parent should be set in 418.

Figure 4C:
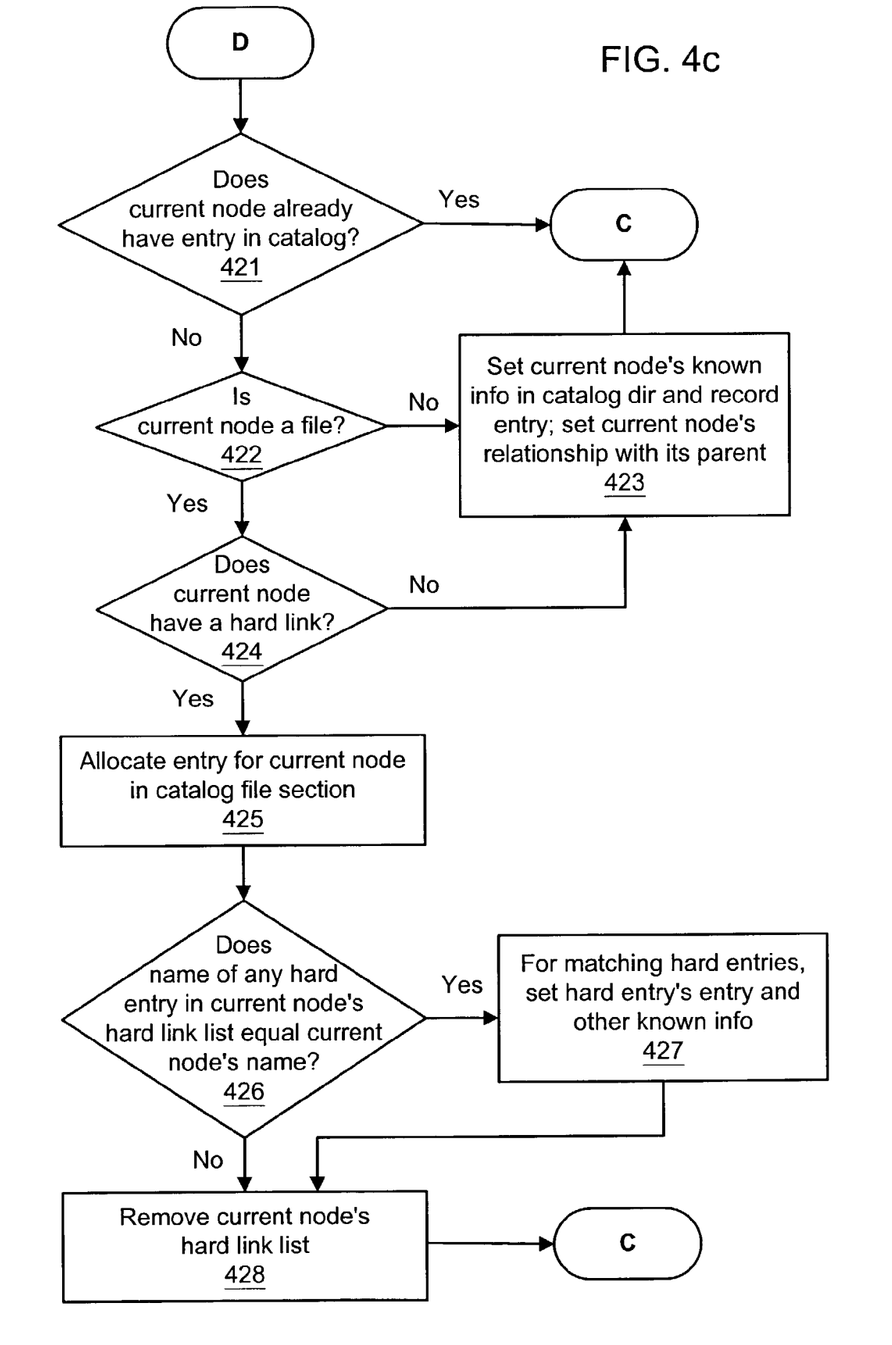

In 421, it may be determined whether the current node already has an entry in the catalog 213. If so, then the file-history message processing continues in 401. Otherwise, it may be determined in 422 whether the current node is a file. If not, then in 423 the known information for the current node may be recorded in the directory section of the catalog 213, and the current node's relationship with its parent may be set. If it is determined in 424 that the current node is a file with a hard link, then an entry in the file section of the catalog 213 may be allocated for the current node.

In 426, it may be determined whether the name of any hard entry in the current node's hard link list is the same as the current node's name. If so, then the hard entry's information should be set in the catalog 213. If not, then in 427 the hard link list should be removed for the current node in 428. The file-history message processing may then continue in 401.

Figure 4D:
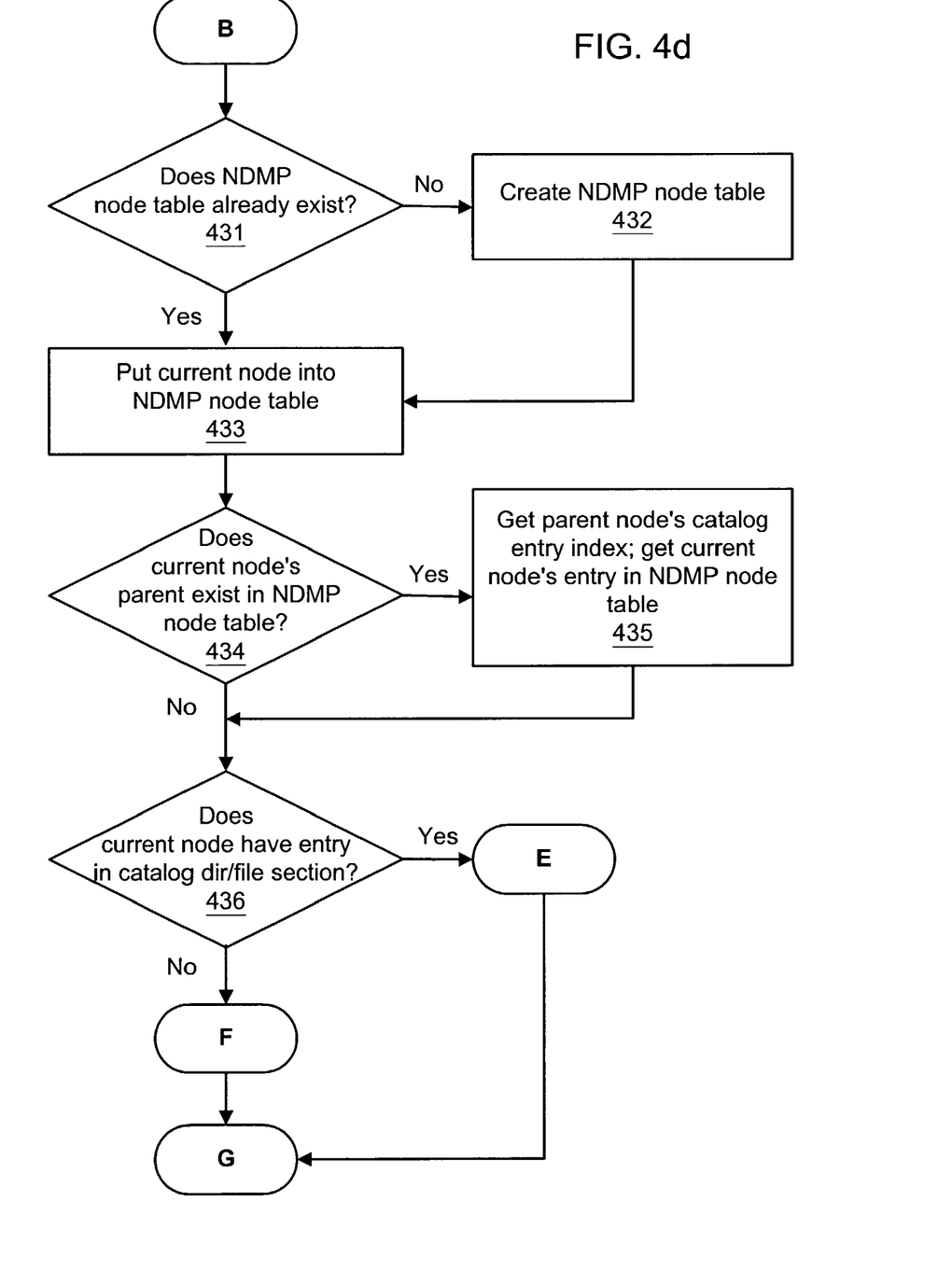

For NODE messages, it may be determined in 431 whether the NDMP node table already exists. If not, then in 432 the node table should be created in the temporary storage 215. The current node may be placed into the node table in 433. In 434, it may be determined whether the parent of the current node exists in the node table. If so, then in 435 the parent node's catalog entry index and the current node's entry in the node table may both be retrieved. In 436, it may be determined whether the current node has an entry in the catalog (either the directory or file section). If so, then the file-history message processing may continue in 441. Otherwise, the file-history message processing may continue in 451.

Figure 4E:
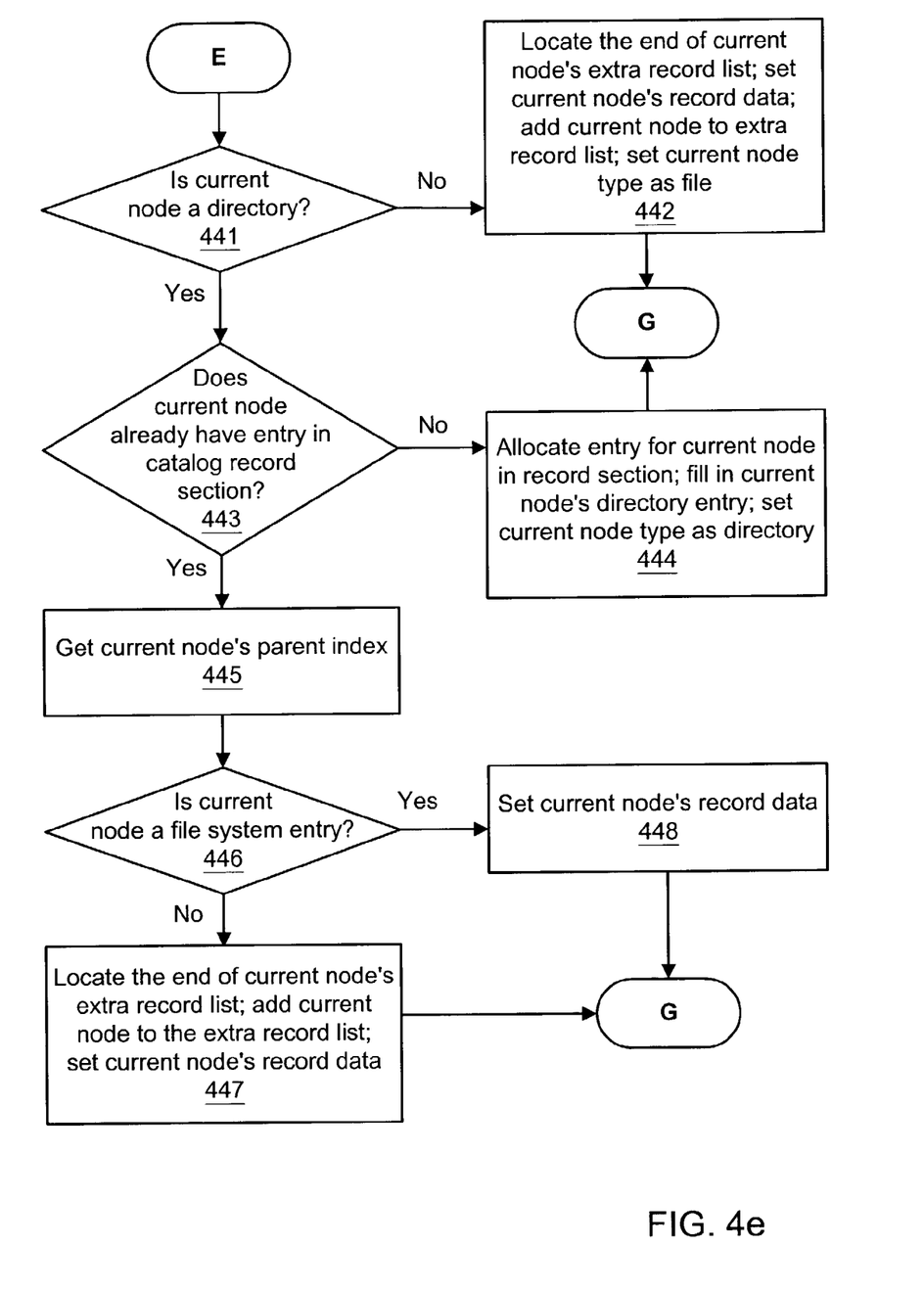

In 441, it may be determined whether the current node is a directory. If not, then in 442 the end of the current node's extra record list may be located. The current node's record data may also be set, the current node may be added to the extra record list, and the current node type may be set to "file." Otherwise, it may be determined in 443 whether the current node already has an entry in the catalog record section. If not, then in 444 an entry may be allocated for the current node in the record section. The directory entry for the current node may be filled in, and the current node type may be set to "ditrectory." If the current node is not a directory and the current node does not already have an entry in the catalog record section, then the file-history message processing may continue in 461.

In 445, the current node's parent index may be retrieved. In 446, it may be determined whether the current node is a filesystem entry. If so, then the current node's record data may be set in 448, and the file-history message processing may continue in 461. Otherwise, in one embodiment, the end of the current node's extra record list will be located, the current node's record data will be set, the current node will be added to the extra record list, and the current node's record data will also be set in 447.

Figure 4F:
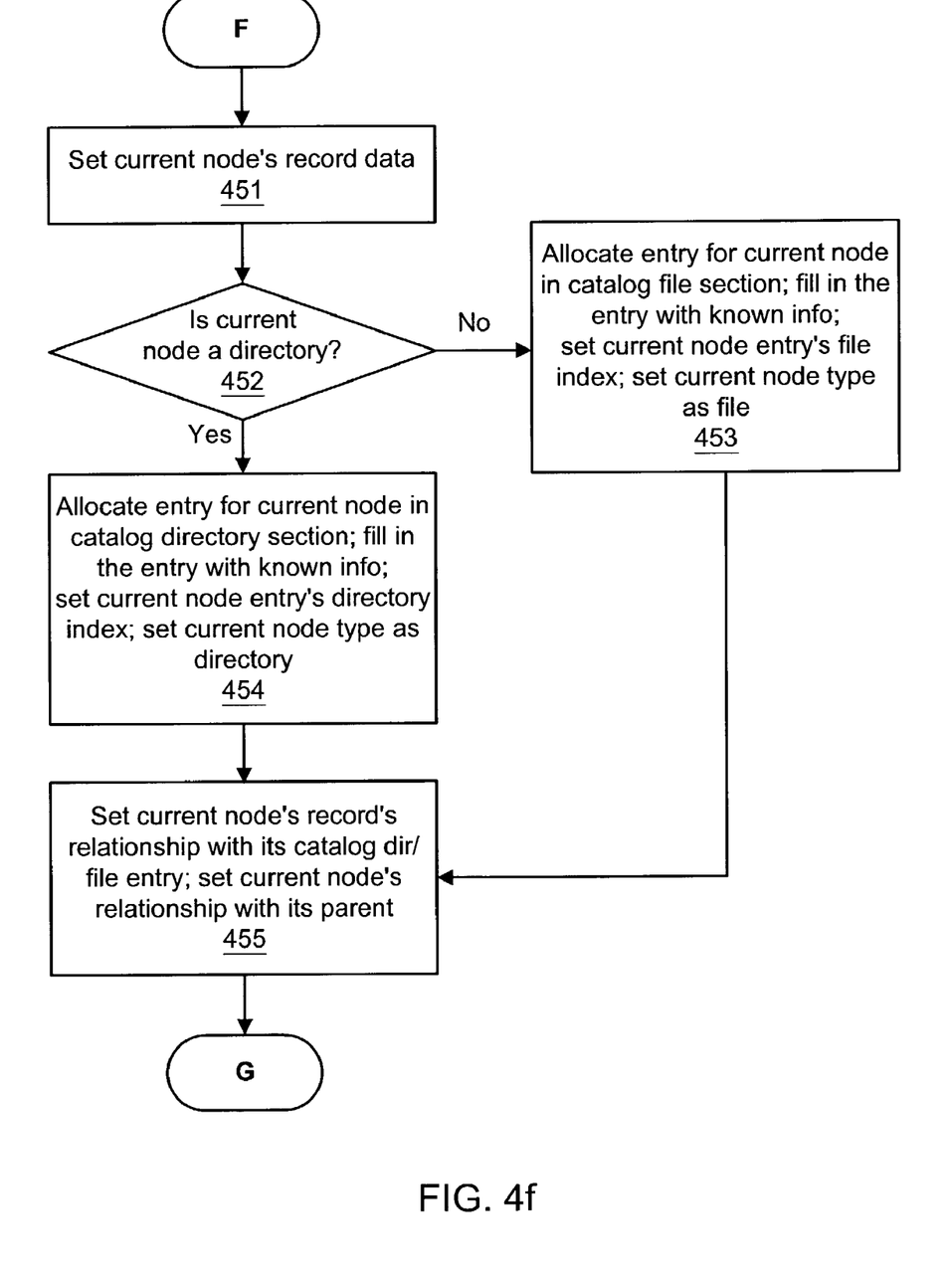

In 451, the current node's record data may be set. In 452, it may be determined whether the current node is a directory. If not, then in 453 an entry for the current node may be allocated in the file section of the catalog. The entry may be filled in with the information known about the current node, the file index for the catalog entry for the current node may be set, and the current node type may be set as "file." If the current node is a directory, then in 454 an entry for the current node may be allocated in the directory section of the catalog. The entry may be filled in with the information known about the current node, the directory index for the catalog entry for the current node may be set, and the current node type may be set as "directory." In 455, the relationship between the current node's record and its entry in the catalog may be set. The current node's relationship with its parent may also be set.

Figure 4G:
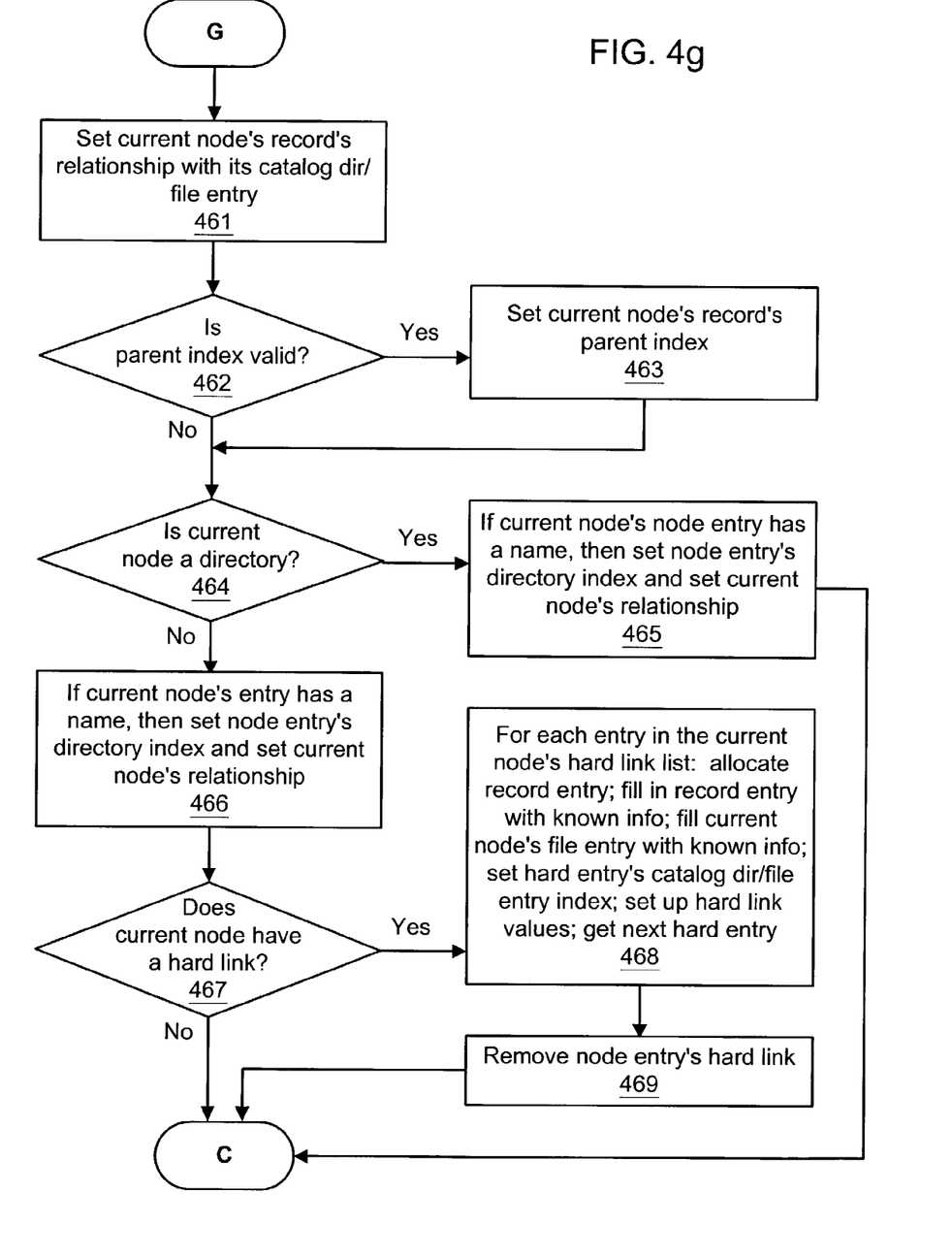

In 461, if it has not already been performed, the relationship between the current node's record and its entry in the catalog may be set. In 462, it may be determined whether the parent index is valid. If so, then the parent index for the current node's record may be set in 463. In 464, it may be determined whether the current node is a directory. If so, and if the current node's node entry has a name, then in 465 the node entry's directory index and current node's relationship may be set. The file-history message processing may then continue in 401.

If not, and if the current node's node entry has a name, then in 466 the node entry's file index and current node's relationship may be set. It may be determined in 467 whether the current node has a hard link. If not, then the the file-history message processing may continue in 401. Otherwise, then in 468 several actions may be performed for each entry in the current node's hard link list. A record entry may be allocated and filled in with the information known about the record. The current node's file entry may be filled in with the information known about the current file. The catalog entry index for the hard entry may be set. Finally, the hard link values may be set up. After all the hard links have been processed, the node entry's hard link may be removed. The file-history message processing may then continue in 401.

Various embodiments may further include receiving or storing instructions and/or data implemented in accordance with the foregoing description upon a carrier medium. Suitable carrier media may include storage media or memory media such as magnetic or optical media, e.g., disk or CD-ROM, as well as transmission media or signals such as electrical, electromagnetic, or digital signals, conveyed via a communication medium such as a network and/or a wireless link.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A method for creating a catalog for describing backup data, wherein the method comprises:

receiving a plurality of messages at a first computer system from a second computer system, wherein each message comprises information describing a node in a filesystem, wherein the information in each message comprises hierarchy information describing a node in the filesystem or attribute information describing a node in the filesystem;

for each message comprising hierarchy information describing a node in the filesystem, creating an entry for the respective node in the catalog and storing the hierarchy information for the respective node in the catalog, wherein creating the entry for the respective node in the catalog and storing said hierarchy information for the respective node in the catalog for each of at least some of the plurality of messages are performed prior to receipt by the first computer system of others of said plurality of messages; and for each message comprising attribute information describing a node in the filesystem, storing the attribute information for the respective node in the catalog, wherein the storing of said attribute information for the respective node in the catalog for each of at least some of the plurality of messages is performed prior to receipt by the first computer system of others of said plurality of messages.

2. The method for creating a catalog for describing backup data as recited in claim 1, wherein creating the entry and storing the hierarchy information for the respective node in the catalog comprises creating a parent-child relationship in the catalog between the respective node and its parent node.

3. The method for creating a catalog for describing backup data as recited in claim 1, wherein the first computer system comprises an NDMP client;

wherein the second computer system comprises an NDMP server; and wherein the messages are received by the NDMP client from the NDMP server using at least one NDMP interface.

4. The method for creating a catalog for describing backup data as recited in claim 1, further comprising:

creating the entries for the nodes in a node table independent of the catalog prior to creating the entries for the nodes in the catalog.

5. The method for creating a catalog for describing backup data as recited in claim 4, further comprising:

destroying the entries in the node table after creating the entries for the nodes in the catalog.

6. A computer system comprising:

one or more microprocessors;

a memory coupled to the one or more microprocessors, the memory including program instructions executable by the one or more microprocessors to:

receive a plurality of messages at a first computer system from a second computer system, wherein each message comprises information describing a node in a filesystem, wherein the information in each message comprises hierarchy information describing a node in the filesystem or attribute information describing a node in the filesystem;

for each message comprising hierarchy information describing a node in the filesystem, create an entry for the respective node in the catalog and store the hierarchy information for the respective node in the catalog, wherein creating the entry for the respective node in the catalog and storing said hierarchy information for the respective node in the catalog for each of at least some of the plurality of messages are performed prior to receipt by the first computer system of others of said plurality of messages; and for each message comprising attribute information describing a node in the filesystem, store the attribute information for the respective node in the catalog, wherein storing said information for the respective node in the catalog for each of at least some of the plurality of messages is performed prior to receipt by the first computer system of others of said plurality of messages.

7. The computer system as recited in claim 6, wherein in creating the entry and storing the hierarchy information for the respective node in the catalog, the program instructions are further executable by the one or more microprocessors to create a parent-child relationship in the catalog between the respective node and its parent node.

8. The computer system as recited in claim 6,
wherein the first computer system comprises an NDMP client;
wherein the second computer system comprises an NDMP server; and
wherein the messages are received by the NDMP client from the NDMP server using at least one NDMP interface.

9. The computer system as recited in claim 6, wherein the the program instructions are further executable by the one or more microprocessors to:
create entries for the nodes in a node table independent of the catalog prior to creating the entries for the nodes in the catalog.

10. The computer system as recited in claim 9, wherein the the program instructions are further executable by the one or more microprocessors to:
destroy the entries in the node table after creating the entries for the nodes in the catalog.

11. A computer readable medium including program instructions executable to implement:
receiving a plurality of messages at a first computer system from a second computer system, wherein each message comprises information describing a node in a filesystem, wherein the information in each message comprises hierarchy information describing a node in the filesystem or attribute information describing a node in the filesystem;
for each message comprising hierarchy information describing a node in the filesystem, creating an entry for the respective node in the catalog and storing the hierarchy information for the respective node in the catalog, wherein creating the entry for the respective node in the catalog and storing said hierarchy information for the respective node in the catalog for each of at least some of the plurality of messages are performed prior to receipt by the first computer system of others of said plurality of messages; and
for each message comprising attribute information describing a node in the filesystem, storing the attribute information for the respective node in the catalog, wherein storing said attribute information for the respective node in the catalog for each of at least some of the plurality of messages is performed prior to receipt by the first computer system of others of said plurality of messages.

12. The computer readable medium as recited in claim 11, wherein creating the entry and storing the hierarchy information for the respective node in the catalog comprises creating a parent-child relationship in the catalog between the respective node and its parent node.

13. The computer readable medium as recited in claim 11,
wherein the first computer system comprises an NDMP client;
wherein the second computer system comprises an NDMP server; and
wherein the messages are received by the NDMP client from the NDMP server using at least one NDMP interface.

14. The computer readable medium as recited in claim 11, wherein the program instructions are further executable to implement:
creating entries for the nodes in a node table independent of the catalog prior to creating the entries for the nodes in the catalog.

15. The computer readable medium as recited in claim 14, wherein the program instructions are further executable to implement:
destroying the entries in the node table after creating the entries for the nodes in the catalog.

16. A system for creating a catalog for describing backup data, wherein the system comprises:
means for receiving a plurality of messages at a first computer system from a second computer system, wherein each message comprises information describing a node in a filesystem, wherein the information in each message comprises hierarchy information describing a node in the filesystem or attribute information describing a node in the filesystem;
means for creating an entry for a node in the catalog for each message comprising hierarchy information describing the respective node, wherein creating the entry for the node in the catalog for each of at least some of the plurality of messages is performed prior to receipt by the first computer system of others of said plurality of messages;
means for storing the hierarchy information for the node in the catalog for each message comprising hierarchy information describing the respective node, wherein storing said hierarchy information for the node in the catalog for each of at least some of the plurality of messages is performed prior to receipt by the first computer system of others of said plurality of messages; and
means for storing the attribute information for the respective node in the catalog for each message comprising attribute information describing the respective node, wherein storing said attribute information for the respective node in the catalog for each of at least some of the plurality of messages is performed prior to receipt by the first computer system of others of said plurality of messages.

* * * * *